United States Patent [19]

Brantley

[11] 4,250,718
[45] Feb. 17, 1981

[54] ICE MAKER CONVERSION APPARATUS AND METHOD

[76] Inventor: Ralph H. Brantley, 3823 Weyburn Rd., Durham, N.C. 27704

[21] Appl. No.: 71,990

[22] Filed: Sep. 4, 1979

[51] Int. Cl.³ .............................................. F25C 5/12
[52] U.S. Cl. ...................... 62/354; 277/59; 277/75
[58] Field of Search .............. 62/354; 277/29, 59, 277/75

[56] References Cited

U.S. PATENT DOCUMENTS

| | | | |
|---|---|---|---|
| 2,952,141 | 9/1960 | Nelson et al. | 62/354 |
| 3,678,809 | 7/1972 | Doutt | 277/29 X |
| 3,909,154 | 9/1975 | Robb et al. | 277/29 X |
| 3,971,563 | 7/1976 | Sugimura | 277/59 X |
| 4,078,809 | 3/1978 | Garrick et al. | 277/29 X |
| 4,106,779 | 8/1978 | Zabcik | 277/59 X |
| 4,114,900 | 9/1978 | Wiese | 277/29 X |

*Primary Examiner*—William E. Tapolcai, Jr.
*Attorney, Agent, or Firm*—B. B. Olive

[57] ABSTRACT

A conventional Reynolds-type ice maker evaporator assembly such as is used in a drink dispensing machine is modified to accommodate a novel form of seal assembly for prevention of water seepage into the transmission or gear box, to allow conventional ball bearings to be replaced with roller bearings and to accommodate a unique grease fitting arrangement so that both the upper and lower ends of the auger may be lubricated.

5 Claims, 12 Drawing Figures

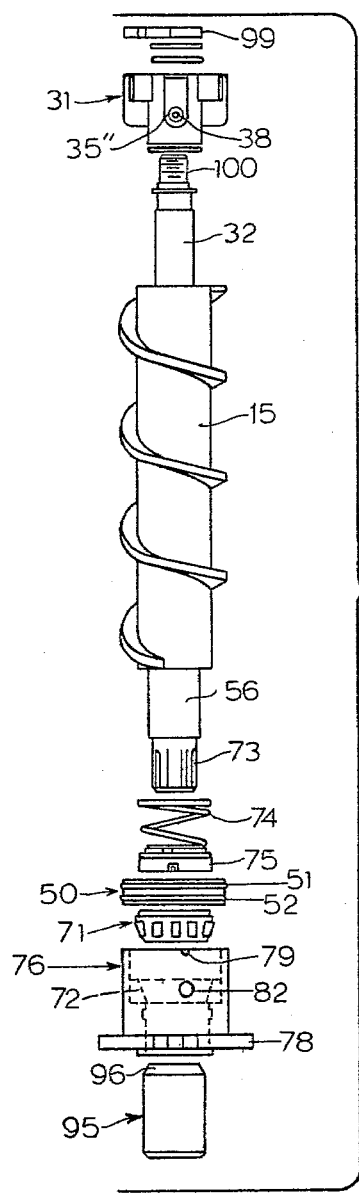
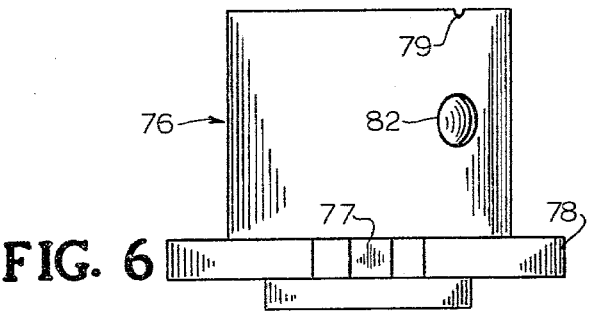
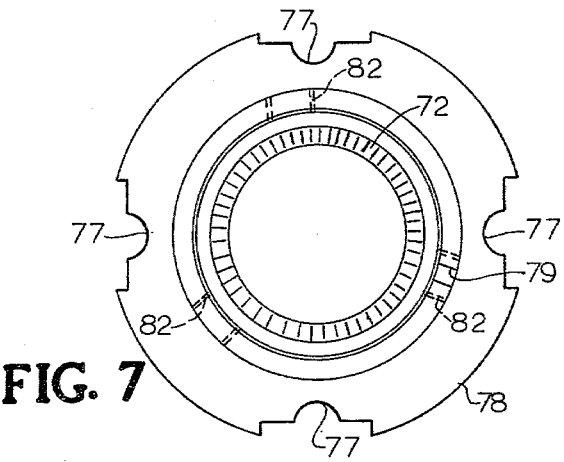
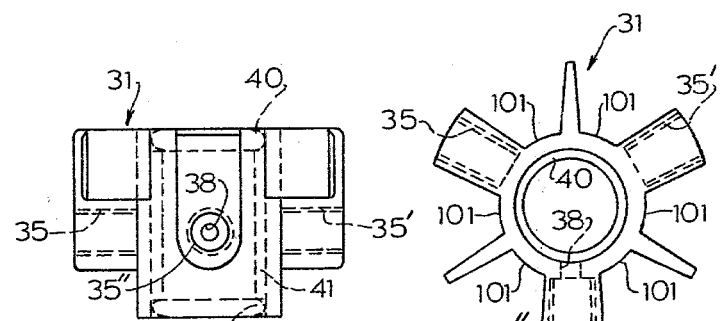
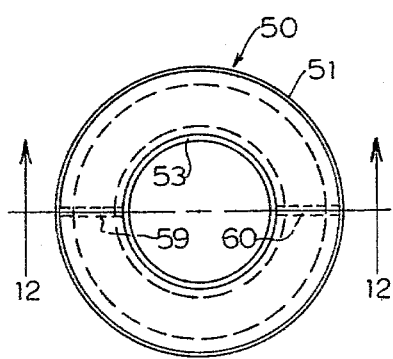
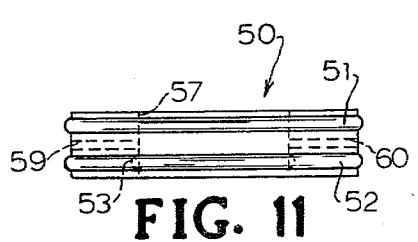
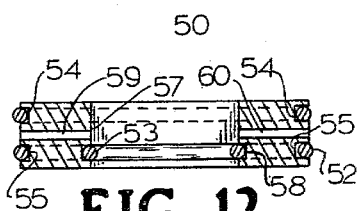

ICE MAKER CONVERSION APPARATUS AND METHOD

BACKGROUND OF THE INVENTION

1. Field of the Invention

This invention relates to ice making machines and particularly to a Reynolds-type ice making unit used in association with drink vending machines which discharge a small amount of ice in the container for each drink.

2. Description of the Prior Art

Combination ice making and dispensing machines are in use in cafeterias, restaurants, hospitals, soda fountains, drive-in restaurants and the like. Such ice making and dispensing devices are a part of a soft drink dispensing machine of the type where cups, flavor concentrates or syrups and sources of water and carbonation are maintained within the dispensing machine. Upon insertion of a coin in the machine, a cup is placed in position to receive the flavor concentrate and water and including carbonated water, if desired. In such soft drink dispensing machines it is also desirable to place a small quantity of ice in the drink since the public generally desires to have ice, particularly in a soft drink, despite the fact that the components of the soft drink are maintained at temperatures near the freezing point. Prior ice making machines have been unsatisfactory when incorporated in soft drink dispensing machines for the principal reason that the ice making units constantly need repair and replacement of parts which in turn takes the machine out of operation while repairs are being made.

U.S. Pat. Nos. 3,196,624 and 3,196,628 are illustrative of the type of ice making units involved in the present invention. The ice making units of the type illustrated in the mentioned patents have been found to frequently require bearing replacement, repair to the ice auger and repair and replacement of transmission parts due to water seepage into this area. Thus, the object of the present invention is to provide a method for modifying this type of ice making unit to accommodate new and improved components and also to operate in an improved manner to overcome the mentioned undesirable characteristics of such an ice making unit. Other objects will become apparent as the description proceeds.

SUMMARY OF THE INVENTION

The present invention provides for a method of and the apparatus necessary for modification of the evaporator assembly of a Reynolds-type ice maker unit to reduce maintenance and increase its operational life. As an initial step, the evaporator assembly is removed from the ice maker and the conventional extruding head is removed and modified to prevent the source of water leakage which in the past has caused costly maintenance problems. The extruding head is further modified to receive a uniquely designed grease fitting which is adapted to pass through the top collar portion of the evaporator housing and to allow lubrication of the extruder head assembly without allowing leakage of the lubricant into the ice area. The lower bearing housing of the evaporator assembly is modified to accommodate an improved roller bearing assembly in lieu of the conventional ball bearing assembly normally retained therein. Alterations are also made to the assembly to provide for addition of a second grease fitting at the lower end of the evaporator housing so that the roller bearing and auger shaft may also receive the proper lubrication to prevent undue wear. Also, an improved and novel water seal construction is positioned on the auger shaft adjacent the lower end of the evaporator housing and is designed to positively prevent water seepage into the transmission or drive assembly from the auger and to divert excess water in this area from the evaporator housing.

DESCRIPTION OF THE DRAWINGS

FIG. 5 is an exploded view of certain parts of the evaporator assembly which are retained within the evaporator sleeve, the sleeve itself not being shown.

FIG. 6 is a side elevation view of the bearing housing as modified by the present invention.

FIG. 7 is a top plan view of the FIG. 6 bearing housing.

FIG. 8 is a side elevation view of the modified extruder head of the present invention.

FIG. 9 is a top plan view of the FIG. 8 extruder head.

FIG. 10 is a top plan view of a new seal construction employed in the present invention.

FIG. 11 is a side elevation view of the new seal construction of FIG. 10.

FIG. 12 is a section view taken substantially along line 12—12 of FIG. 10.

DESCRIPTION OF THE PREFERRED EMBODIMENT

Figure 1:
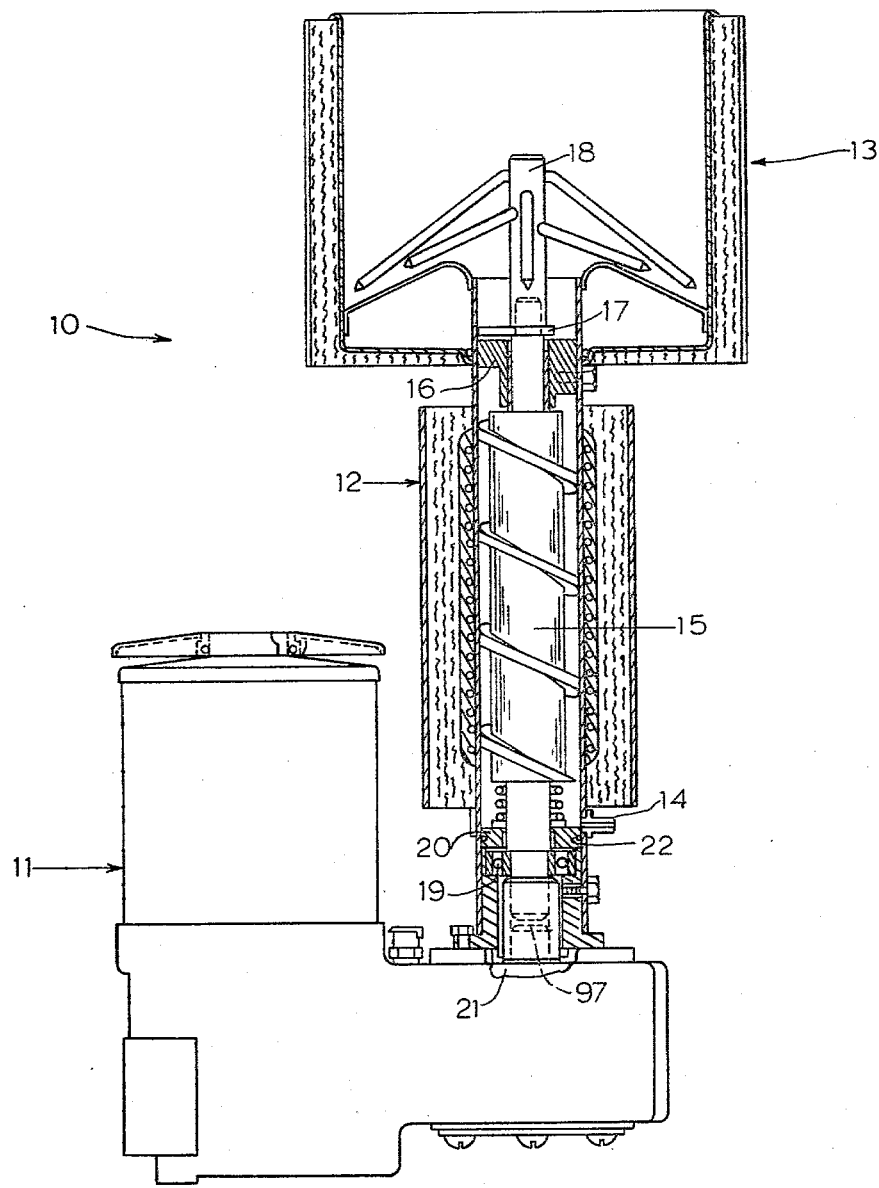
FIG. 1 is a fragmentary section view through a prior art Reynolds-type ice maker unit prior to modification according to the invention.
Figure 2:
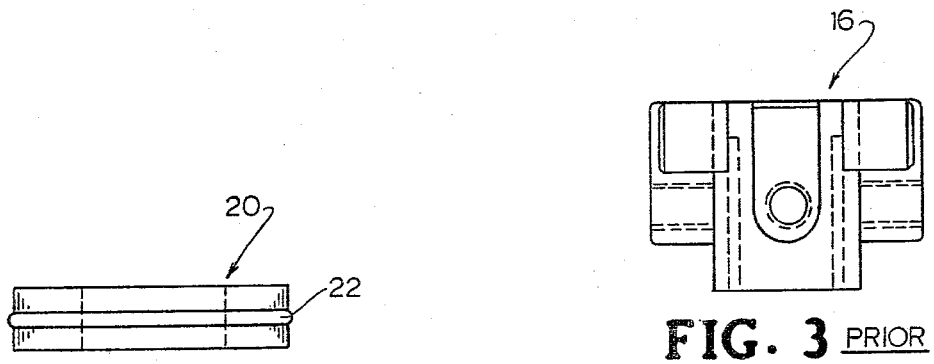
FIG. 2 is side elevation view of a ceramic seal employed in the conventional Reynolds-type ice maker unit.
Figure 3:
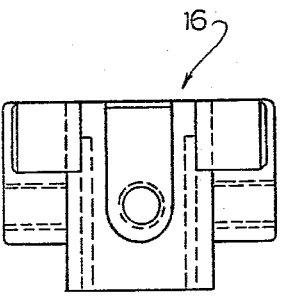
FIG. 3 is a side elevation view of the type extruder head employed in the conventional Reynolds-type ice maker unit.

Reference is first made to FIG. 1 which illustrates a prior art Reynolds-type ice maker unit 10, comprising a motor assembly 11, an evaporator assembly 12 and a hopper assembly 13. Very briefly stated, water enters evaporator assembly 12 through water inlet 14 and is moved upwardly by auger 15 within evaporator assembly 12. As the water is moved upward, it is chilled and is converted to a frozen state during the time of passage to the top of auger 15 from which it is forced through extruder 16 and is cut or flaked by cutter 17. The flaked ice is then stored within hopper assembly 13 and is agitated by agitator 18.

Numerous deficiencies have developed in the prior art ice maker unit 10 and which form the basis for the improvements of the present invention. For example, it may be noted that ice maker 10 has been plagued with leaks below auger 15 which allows water seepage into the drive or transmission. Also, the ball bearing assembly 19 has required frequent replacement due to the wear caused by the downward pressure (600 pounds) on bearing 19. Major wear has occurred to the sides of auger 15, extruding head 16 and cutter 17 due to failure of the ball bearing assembly 19 under the pressure and these components have required replacement. Repair expenses and machine down time for repair have therefore been of considerable concern in the trade.

Turning now to a description of FIGS. 4 through 12, the description will be principally directed to improvements to the evaporator unit 30 since all of the improvements associated with the present invention and aimed at overcoming the mentioned deficiencies are associated with the evaporator unit 30. Other components of the described type of prior art ice maker unit 10 have been retained.

One area of improvement is associated with the extruder 31. In particular, extruder 31 has been modified to prevent leakage and, of even greater importance, to provide a means for forcing a lubricant between mating surfaces of extruder 31 and auger shaft 32. Three screws in the prior art form of extruder 31 retain the extruder head in place and passed through three corresponding holes provided in the upper sleeve of the evaporator assembly. In the improved ice maker evaporator assembly 30, extruder 31 is maintained in sleeve 33 of evaporator housing 34 by a pair of screws, not shown, which pass through the already existing screw holes in sleeve 33 and into a pair of the existing threaded holes, designated 35, 35' in extruder 31. The third existing hole, designated 36 (FIG. 4), in sleeve 33 is utilized to receive a special designed grease fitting 37 which mounts in the third existing threaded hole, designated 35'', in extruder 31. A new hole 38 is drilled in extruder 31 to mate with threaded hole 35'' as best illustrated in FIG. 9 and extends completely through the wall of extruder 31 to provide access to the outer surface of auger shaft 32. Once extruder 31 is secured within sleeve 33 by the mentioned pair of screws, not shown, the grease fitting 37 is threadably secured in place within sleeve 33 and extruder 31. This arrangement allows grease to be forced through fitting 37 and hole 38 to lubricate the mating surface areas between extruder 31 and auger shaft 32.

Extruder 31 has been further modified to accept a pair of O-rings 39, 40 which prevent seepage of the grease from the confined area into the ice making area. An existing sleeve bearing 41 is moved upwardly from its normal position so as to occupy a central position within extruder 31 which enables O-ring 39 to fit into the lower end of extruder 31 and O-ring 40 to fit into the upper end of extruder 31. A washer 42 holds O-ring 39 in place. Heretofore, no means was available for lubricating the mating surfaces between auger shaft 32 and extruder 31 and which, in turn, resulted in a necessary and frequent replacement of parts due to lack of such lubrication. Thus, with relatively minor modification of the extruder 31 and by utilizing a grease fitting design to fit into an already existing threaded hole in extruder 31, maintenance of the parts associated with the operation of extruder 31 has been greatly improved.

Another and major area of improvement resides in the area of the lower portion of evaporator unit 30. To accomplish this improvement, seal 20 of the prior art ice maker is replaced by a new, improved seal 50 illustrated in FIGS. 4-5 and 10-12. Unlike the prior art seal 20 which has only a single O-ring 22 around its outer wall, seal 50 has three O-rings 51, 52, and 53 which aid in preventing water from seeping back into transmission 21. O-rings 51, 52 reside in grooves 54, 55 in the outer wall of seal 50 and effectively prevent any water from seeping between lower auger shaft 56 and the lower inside wall of sleeve 33. The hole 57 which passes through the new seal 50 is of sufficient diameter to allow seal 50 to slidably mount on lower auger shaft 56 and with clearance minimized to prevent leakage of water. However, the degree of practical clearance required for operation is still sufficient to allow water to seep between seal 50 and shaft 56 and especially so when pressure builds up within sleeve 33. The O-ring 53 which resides in groove 58 prevents any water seeping between the upper portion of seal 50 and shaft 56 from going any further. A pair of drainage holes 59, 60 are formed in seal 50 and extend outward from hole 57 so that any water getting between seal 50 and shaft 56 and which is prevented from going further down by means of O-ring 53 is directed outwardly through holes 59, 60. In order to accommodate the water which is drained in this manner, the lower end of sleeve 33 has a hole 61 drilled therein and which mates with holes 59, 60 to channel such excess water to the outside of the ice maker as best illustrated in FIG. 4.

Another area of improvement in the lower portion of evaporator 30 lies in the replacement of ball bearing 19 with roller bearing 70. Roller bearing 70 is a conventional item and comprises a cone section 71 which mounts in cup section 72 and receives the spline end 73 of lower auger shaft 56. Cup section 72 rests on a ledge 62 of housing 76. The two bearing components, i.e., cup 72 and cone 71, are held in place by spring 74 and seal 75 which are mounted on lower auger shaft 56 and which apply a downward force upon seal 50 which in turn applies a downward force upon cone section 71. Seal 75 has a carbon washer 62 which is used to prevent water from passing between seal 75 and seal 50.

Figure 4:
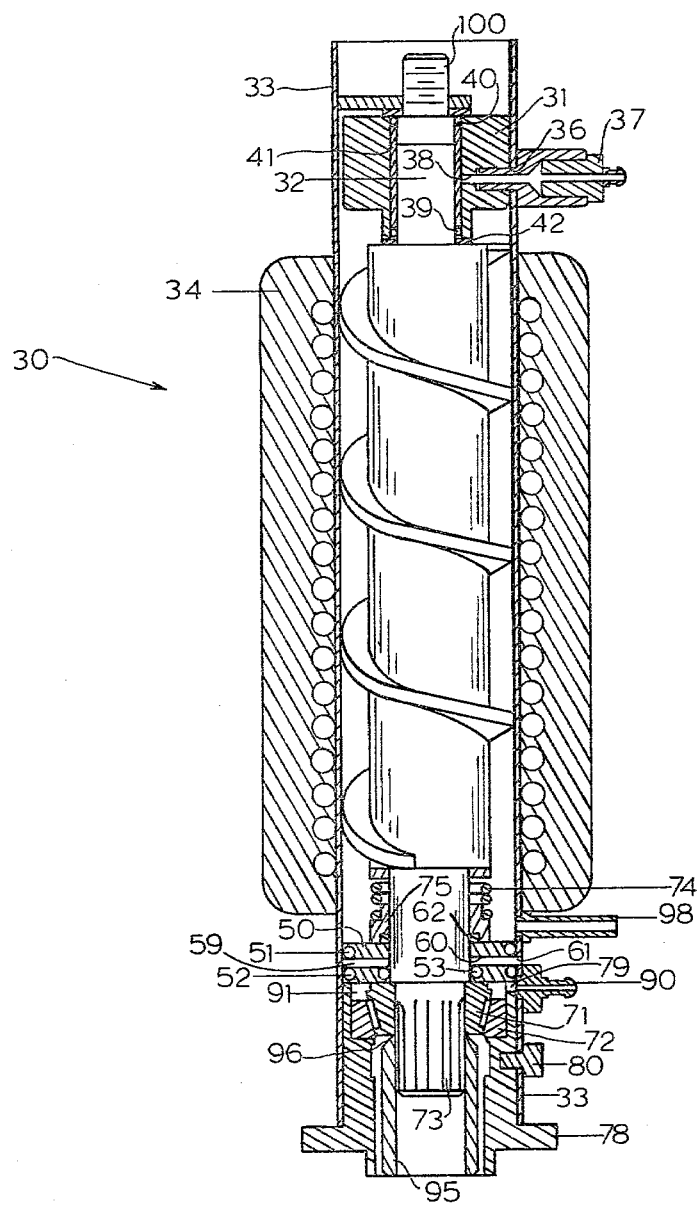
FIG. 4 is a fragmentary section view through the modified evaporator assembly of the present invention.

Housing 76 is fixed within the lower end section of sleeve 33 and is held in place by three bolts 80 which pass through holes 81 in sleeve 33 and tighten into holes 82 of housing 76, only one such bolt and hole arrangement being illustrated as seen in FIG. 4. Housing 76 has already existing notches 77 formed in the outer flange 78 to receive bolts (not shown) which are drawn tight on flange 78 to retain evaporator 30 in place on motor assembly 12. However, housing 76 is modified to include an additional notch 79 in the top edge of housing 76 and whose purpose is described in later description.

In addition to modifying the evaporator assembly 30 to receive the roller bearing assembly 70 in place of the conventional ball bearing assembly 19 to offset the considerable pressure formed inside sleeve 33 and which in the past as caused excessive wear to the parts, further modification is made to provide means whereby the roller bearing 70 may be lubricated to reduce any excess wear thereon. For this purpose, a grease fitting is threadably secured in a threaded hole formed in sleeve 33 as best illustrated by FIG. 4. The new fitting 90 aligns with the previously-mentioned notch 79 in housing 76 and thus provides a passage for grease to enter the area 91 beneath seal 50. Such lubricant thus reaches the cone section 71 and the roller bearings therein and provides means to lubricate an area not previously accessible for lubrication.

Spline coupling 95 which is found in the type ice maker unit being described as a standard component is modified so as to increase the chamfer 96 formed on the top edge of coupling 95. Such modified chamfer 96 thus allows the spline coupling 95 to be mounted on the spline end 73 so that only a small area of coupling 95 actually contacts cone section 71 of roller bearing 70. Once secured on the spline end 73, spline coupling 95 mounts on transmission draft shaft 97, as seen in FIG. 1. As transmission 21 powers shaft 97, coupling 95 in turn drives the auger 15.

In operation, water is admitted into the modified evaporator assembly 30 through existing water inlet 98 which is made integral with sleeve 33 and discharges a constant supply of water into the area of auger 15. This water then solidifies as it moves upward with the aid of auger 15. A cutter 99 mounts on the upper threaded portion 100 of auger 15 and rotates therewith so that as the solidified ice is forced upward between openings 101 of extruder 31, the ice is cut into cubes or flaked and stored in the hopper assembly 13.

What is claimed is:

1. An ice making apparatus comprising, in combination:
   (a) an upstanding evaporator assembly having an outlet at the upper end thereof;
   (b) means for supplying water to said evaporator assembly;
   (c) means for cooling said evaporator assembly including cooling means surrounding a vertical sleeve;
   (d) an upstanding auger having upper and lower shaft ends mounted in said sleeve for scraping and delivering flaked ice to said outlet;
   (e) an extruding head positioned on said auger upper shaft end and having a plurality of ice compressing and shaping passages therethrough, said extruding head having a centrally positioned, press fitted sleeve bearing mounted on said auger upper shaft end, having a plurality of peripherally-spaced, radially-directed threaded holes formed in outer surface portions thereof with at least a pair of such holes having threaded fasteners passing through said sleeve and acting to secure said extruding head thereto, having at least one of such threaded holes modified to include an opening communicating through said sleeve bearing with said auger upper shaft end, having a threaded grease fitting extending outwardly from said sleeve mounted in said modified hole enabling lubrication of mating surfaces between said sleeve bearing and said auger upper shaft end, and having O-rings positioned at the upper and lower ends of said sleeve bearing to retain said lubrication;
   (f) drive mechanism located below and coupled to said auger lower shaft end for operating said auger to force the flaked ice from said outlet into and through said passages;
   (g) an auger support and sealing assembly mounted below said auger and above said drive mechanism and including:
      (i) a compression spring and spring support assembly surrounding and mounting a sliding carbon seal surrounding said auger lower end;
      (ii) an auxiliary seal mounted on said auger lower shaft end below said spring and spring support assembly and comprising an annular structure mounting a pair of vertically-spaced external O-rings at its upper and lower ends in press-fitted relation with the internal surface of said evaporator assembly sleeve, another O-ring mounted within said annular structure proximate the lower end thereof and engaging said auger lower shaft end, and having a horizontal passage formed through the body of said annular structure between said pair of external O-rings and above said internal O-ring and communicating through a mating hole in said evaporator assembly sleeve enabling any water collected above said annular structure internal O-ring to drain through said passage to be discharged through said hole in said sleeve;
      (iii) a bearing housing having an upper cylindrical portion residing within and secured by threaded fastener means to said evaporator assembly sleeve, a lower flange portion secured to said drive mechanism and having a lubrication passage formed on the upper end thereof;
      (iv) a bearing assembly mounted in the upper end of said housing approximate said housing lubrication passage and below said auxiliary seal and bearing the thrust imposed thereon; and
      (v) a grease fitting mounted on and extending outwardly from the lower end of said evaporator assembly sleeve and communicating through said hole formed therein and through said lubrication passage with said bearing assembly to permit lubrication thereof; and
   (h) an ice cutter mounted on said auger upper shaft end for rotation therewith and disposed above the upper end of said extruding head to break the extruded ice issuing from said passages into individual shapes.

2. An ice making apparatus as claimed in claim 1 wherein said bearing assembly comprises a roller bearing cup and cone assembly.

3. An ice making apparatus comprising, in combination:
   (a) an upstanding evaporator assembly having an outlet at the upper end thereof;
   (b) means for supplying water to said evaporator assembly;
   (c) means for cooling said evaporator assembly including cooling means surrounding a vertical sleeve;
   (d) an upstanding auger having upper and lower shaft ends mounted in said sleeve for scraping and delivering flaked ice to said outlet;
   (e) an extruding head positioned on said auger upper shaft end and having a plurality of ice compressing and shaping passages therethrough, said extruding head having a centrally positioned, press-fitted sleeve bearing and annular sealing means fitted in said head at upper and lower ends of said sleeve bearing and surrounding said auger upper shaft end, having a plurality of peripherally-spaced, radially-directed threaded holes formed in outer surface portions thereof with threaded fasteners passing through said sleeve and acting to secure said extruding head thereto and having a grease fitting mounted on and extending outwardly from said sleeve and communicating through passage means formed in said head and sleeve bearing to the mating surfaces between said sleeve bearing and said auger upper shaft end to permit lubrication thereof;
   (f) drive mechanism located below and coupled to said auger lower shaft end for operating said auger to force the flaked ice from said outlet into and through said passages;
   (g) an auger support and sealing assembly mounted below said auger and above said drive mechanism and including:
      (i) a compression spring and spring support assembly surrounding and mounting a sliding seal surrounding said auger lower end;
      (ii) an auxiliary seal mounted on and surrounding said auger lower shaft end and comprising an annular structure with external and internal sealing means engaging corresponding mating surfaces of said evaporator assembly sleeve and said auger lower shaft end to block passage of water to said drive mechanism and having a water passage formed in said annular structure communicating through a mating hole in said evaporator assembly sleeve to pass any water collected above said auxiliary seal to be discharged through said hole in said sleeve;

(iii) a bearing housing having an upper cylindrical portion residing within and secured by threaded fastener means to said evaporator assembly sleeve, a lower flange portion secured to said drive mechanism and having a lubrication passage formed on the upper end thereof;

(iv) a bearing assembly mounted in the upper end of said housing proximate said housing passage and below said auxiliary seal and bearing the thrust imposed thereon; and (v) a grease fitting mounted on and extending outwardly from the lower end of said evaporator assembly sleeve and communicating through said hole formed therein and through said water passage with said bearing assembly to permit lubrication thereof; and (h) an ice cutter mounted on said auger upper shaft end for rotation therewith and disposed above the upper end of said extruding head to break the extruded ice issuing from said passages into individual shapes.

4. A method of converting an ice making apparatus of the type having:

(a) an upstanding evaporator assembly having an outlet at the upper end thereof;

(b) means for supplying water to said evaporator assembly;

(c) means for cooling said evaporator assembly including cooling means surrounding a vertical sleeve;

(d) an upstanding auger having upper and lower shaft ends mounted in said sleeve for scraping and delivering flaked ice to said outlet;

(e) an extruding head positioned on said auger upper shaft end and having a plurality of ice compressing and shaping passages therethrough, having a press-fitted sleeve bearing normally positioned below the upper end of said extruding head and mounted on said auger upper shaft end, having a plurality of peripherally-spaced radially-directed threaded holes formed in outer surface portions thereof and normally having all of such threaded holes occupied by threaded fasteners passing through said sleeve and acting to secure said extruding head thereto;

(f) drive mechanism located below and coupled to said auger lower shaft end for operating said auger to force the flaked ice from said outlet into and through said passages;

(g) an auger support and sealing assembly mounted below said auger and above said drive mechanism and including:

(i) a compression spring and spring support assembly mounting a sliding carbon seal and surrounding said auger lower end;

(ii) an auxiliary seal mounted on said auger lower shaft end below said spring and spring support assembly and comprising an annular structure mounting a single centrally positioned external O-ring in press-fitted relation with the internal surface of said evaporator assembly sleeve;

(iii) a bearing housing having an upper cylindrical portion residing within and secured by threaded fastener means to said evaporator assembly sleeve and a lower flange portion secured to said drive mechanism;

(iv) a bearing assembly having individually rotatable bearings mounted in the upper end of said housing and below said auxiliary seal and bearing the thrust imposed thereon; and (h) an ice cutter mounted on said auger upper shaft end for rotation therewith and disposed above the upper end of said extruding head to break the extruded ice issuing from said passages into individual shapes; and with such conversion being adapted to permit lubrication of said extruding head sleeve bearing and bearing means contained in said bearing housing, comprising the steps:

(a) disassembling said ice making apparatus to permit access to said extruding head, sleeve and auger support and sealing assembly to permit modification thereof in an appropriate operational sequence;

(b) modifying said extruding head by positioning the sleeve bearing therein to a central position and installing a pair of O-rings at the upper and lower ends thereof and by further forming a hole in the inner end of at least one of the already-existing threaded holes and through said sleeve bearing to communicate such modified threaded hole with the internal surface of said sleeve bearing;

(c) replacing said first mentioned auxiliary seal with an improved auxiliary seal comprising an annular structure mounting a pair of vertically-spaced external O-rings at its upper and lower ends adapted to assume a press-fitted relation with the internal surface of said evaporator assembly sleeve, having another O-ring mounted within said annular structure proximate the lower end thereof and adapted to engage said auger lower shaft end and having a water passage formed through the body of said annular structure between said pair of external O-rings and above said internal O-ring and adapted to communicate through a mating hole formed in said evaporator assembly sleeve to pass any water collected above said annular structure internal O-ring through said passage to be discharged through such hole in said said sleeve;

(d) modifying said bearing housing by forming a lubrication passage in the upper end thereof;

(e) modifying said sleeve by forming a hole therein to mate with the said water passage formed in the body of said annular structure of said substitute auxiliary seal;

(f) reassembling said ice making apparatus and securing said extruding heat with fastener means in all of said thread-holes except for the threaded holes having said modified hole formed therein and installing a grease fitting extending outwardly from and through said sleeve and threaded in such modified threaded hole to permit lubrication of mating surfaces between said repositioned sleeve bearing and said auger upper shaft end;

(g) installing another grease fitting on and extending outwardly from the lower end of said evaporator assembly sleeve in a position allowing such other grease fitting to communicate through the hole formed in the sleeve to mate with the mentioned lubrication passage in the upper end of said bearing housing to permit lubrication of said bearing assembly; and (h) in the course of reassembly of said apparatus aligning said substitute auxiliary seal water passage with the mating hole formed in said evaporator assembly sleeve so as to allow any water collected above said annular structure internal O-ring to drain through such water passage to be discharged outwardly of said sleeve.

5. An ice making apparatus comprising, in combination:

(a) an upstanding evaporator assembly having an outlet at the upper end thereof;

(b) means for supplying water to said evaporator assembly;

(c) means for cooling said evaporator assembly including cooling means surrounding a vertical sleeve;

(d) an upstanding auger having upper and lower shaft ends mounted in said sleeve for scraping and delivering flaked ice to said outlet;

(e) an extruding head positioned on said auger upper shaft end and having a plurality of ice compressing and shaping passages therethrough, said extruding head having a centrally positioned, press-fitted sleeve bearing and annular sealing means fitted in said head at upper and lower ends of said sleeve bearing and surrounding said auger upper shaft end, having a plurality of peripherally-spaced, radially-directed threaded holes formed in outer surface portions thereof with threaded fasteners passing through said sleeve and acting to secure said extruding head thereto and having a grease fitting mounted on and extending outwardly from said sleeve and communicating through passage means formed in said head and sleeve bearing to the mating surfaces between said sleeve bearing and said auger upper shaft end to permit lubrication thereof;

(f) drive mechanism located below and coupled to said auger lower shaft end for operating said auger to force the flaked ice from said outlet into and through said passages;

(g) an auger support and sealing assembly mounted below said auger and above said drive mechanism and including:

(i) a compression spring and spring support assembly surrounding and mounting a sliding seal surrounding said auger lower end;

(ii) an auxiliary seal mounted on and surrounding said auger lower shaft end and comprising an annular structure with external and internal sealing means engaging corresponding mating surfaces of said evaporator assembly sleeve and said auger lower shaft end to block passage of water to said drive mechanism and having a water passage formed in said annular structure communicating through a mating hole in said evaporator assembly sleeve to pass any water collected above said auxiliary seal to be discharged through said hole in said sleeve;

(iii) a bearing housing having an upper cylindrical portion residing within and secured by threaded fastener means to said evaporator assembly sleeve, and a lower flange portion secured to said drive mechanism;

(iv) a roller bearing cup and cone bearing assembly mounted in the upper end of said housing proximate said housing passage and below said auxiliary seal and bearing the thrust imposed thereon; and (h) an ice cutter mounted on said auger upper shaft end for rotation therewith and disposed above the upper end of said extruding head to break the extruded ice issuing from said passages into individual shapes.

* * * * *